May 8, 1962 D. Z. ERLE 3,033,219
FLOW PROPORTIONER
Filed May 19, 1960 3 Sheets-Sheet 1

INVENTOR.
DONALD Z. ERLE
BY
Lippincott, Ralls & Hendricson
ATTORNEYS

May 8, 1962 D. Z. ERLE 3,033,219
FLOW PROPORTIONER
Filed May 19, 1960 3 Sheets-Sheet 2
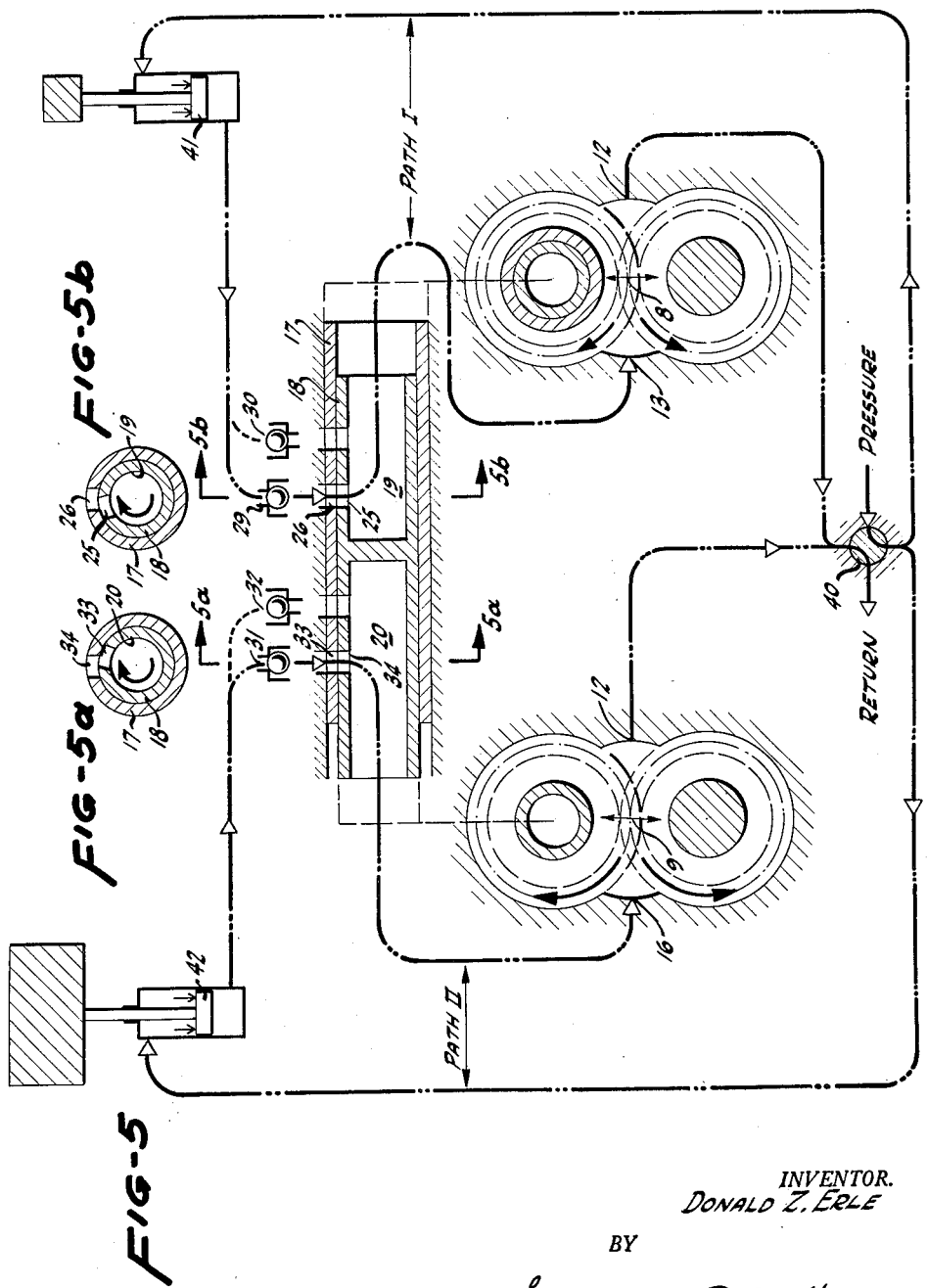
INVENTOR.
DONALD Z. ERLE
BY
Lippincott, Ralls & Hendrickson
ATTORNEYS May 8, 1962
D. Z. ERLE
3,033,219
FLOW PROPORTIONER
Filed May 19, 1960
3 Sheets-Sheet 3
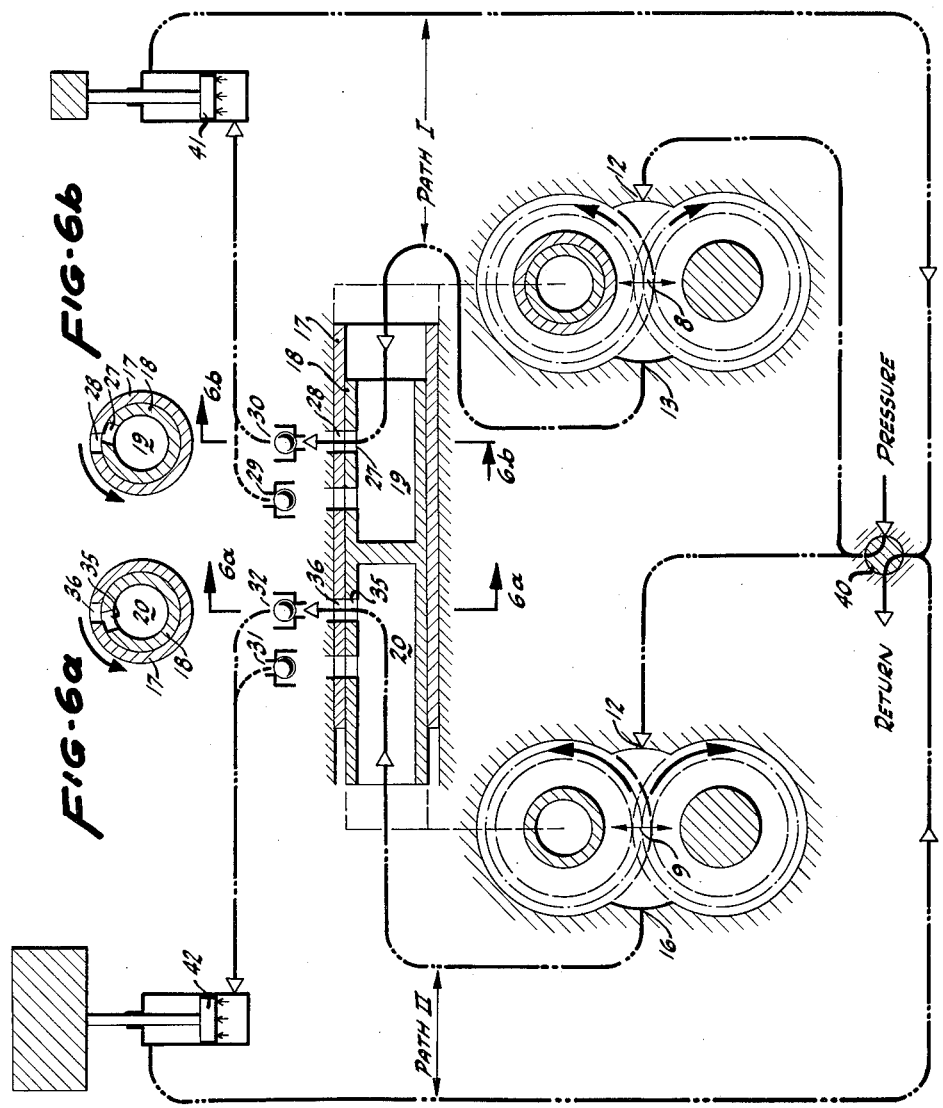
INVENTOR.
DONALD Z. ERLE
BY
Lippincott, Ralls & Hendrickson
ATTORNEYS

United States Patent Office 3,033,219
Patented May 8, 1962

3,033,219
FLOW PROPORTIONER
Donald Z. Erie, Woodside, Calif., assignor to Textron
Inc., Belmont, Calif., a corporation of Rhode Island
Filed May 19, 1960, Ser. No. 30,333
3 Claims. (Cl. 137—100)

The present invention relates to a flow proportioning device to regulate the relative flow rates in two or more fluid paths so that a fixed proportionate flow is maintained. It has a particular application to hydraulic systems—e.g., to synchronize the motions of two or more actuators—where it is desired to divide a common flow into two or more proportional flows (equal or any desired proportion) or to combine two or more flows in controlled proportions into a common flow, regardless of pressure variations or the relation of pressure on the flow lines and regardless of variations in the total flow.

Synchronizing the motions of two or more actuators in a hydraulic system is a very old problem. Without some control device, the actuator with the lesser load will move ahead of the other actuators. Air craft hydraulic systems for operating flaps, dive brakes, landing gear, etc. are typical of one area where this is a serious problem, and it presents unusually critical problems here due to the necessity of having a highly reliable system which is simple, light and inexpensive.

Arrangements heretofore used to synchronize the motions of hydraulic actuators have not been completely satisfactory. For example, the actuators might be mechanically interconnected but, while this method is reliable, it can be very complicated and heavy. Another common arrangement is to install a constant-displacement, rotary, hydraulic motor in each of the actuator lines and mechanically connect all motors together so they rotate at the same or proportionate speeds. The flow in each line being primarily controlled by the speed of the motor in the line and the speeds of all motors being synchronized due to their mechanical interconnection, the relative flows in the lines would be accurately regulated if the flow through each motor were not affected by pressure differences across the motor. However, a pressure differential across a rotary hydraulic motor does affect the volumetric efficiency of the motor and hence the flow rate due to leakage, etc. Therefore, since a difference in actuator loads will result in a different pressure differential across each individual interconnected motor in the system, the method of mechanically connecting hydraulic motors which are disposed in each line is not adequate within itself as the flow rate through each mechanically synchronized motor will not be the same. Various means have been proposed to equalize the pressures at the outlets of the interconnected motors and thus attempt to equalize their volumetric efficiencies. However, this system is heavy, bulky and costly and the valves are complicated.

Even with pressure equalizing valves, the method of interconnecting motors disposed in each line is not fully satisfactory as there remains the mechanical problems imposed by the interconnection, in particular, those posed by the high loads established when one actuator bottoms before another, problems associated with the equalizer valves and their settings covering a wide variation in pressure conditions, leakage in the motor due to the pressure differential across the motor, relatively large and heavy motor components to stand large pressure differentials in the motor, etc.

This invention solves the problem of proportioning the fluid flow among various lines by utilizing a free-running hydraulic motor, whose speed is proportional to its flow rate, in series with a flow regulating valve in each flow path. As disclosed herein, the fluid resistance of the regulating valve is controlled by the relative speeds of the motor associated with the valve as compared to another motor in another flow path so as to maintain a fixed flow ratio between the two flow paths.

Since the motors are not interconnected, but are essentially free-running, there is but a slight pressure differential across the motor. This eliminates the mechanical interconnection problems and the problem of varying volumetric efficiency with pressure variation across the motors as is present in systems utilizing interconnected motors. The motors can be small and light weight since high-speed, light load-capacity motors can be utilized. The accuracy of flow regulation is high as the entire pressure drop needed in each line to regulate the flow is across the simple regulating valve and the pressure differential across the motors, which indirectly control the flow, is only that necessary to overcome the friction of the motor and the valve mechanism.

The flow can be proportioned among any number of lines in any relative proportion desired. Any number of actuators, or the flow in any number of hydraulic lines, can be synchronized. Furthermore, the accuracy of the flow control is very high over a wide flow range and operates equally well with the flow in either direction.

An object of this invention, therefore, is to provide a simple, reliable and highly accurate device to regulate the relative flow rates in two or more fluid paths so that a fixed proportionate flow is maintained in each path relative to the flow in the other paths.

Another object is to divide the common flow of a hydraulic system into two or more proportional flows (equal or any desired proportion) or to combine two or more flows in controlled proportions into a common flow.

Still another object is to synchronize the movement of actuators in a hydraulic system having a plurality of hydraulically actuated mechanisms.

Other objects and features of this invention will become apparent to those skilled in the art from the following detailed description of a preferred embodiment of the invention as illustrated in the accompanying drawings.

FIG. 5 is a schematic diagram of the flow pattern in the device with flow in one direction, FIGS. 5a and 5b being sections along the lines 5a—5a and 5b—5b of FIG. 5;

FIG. 6 is a schematic diagram of the flow pattern in the device with the flow reversed from that of FIG. 5, FIGS. 6a and 6b being sections along the lines 6a—6a and 6b—6b of FIG. 6.

Figure 1:
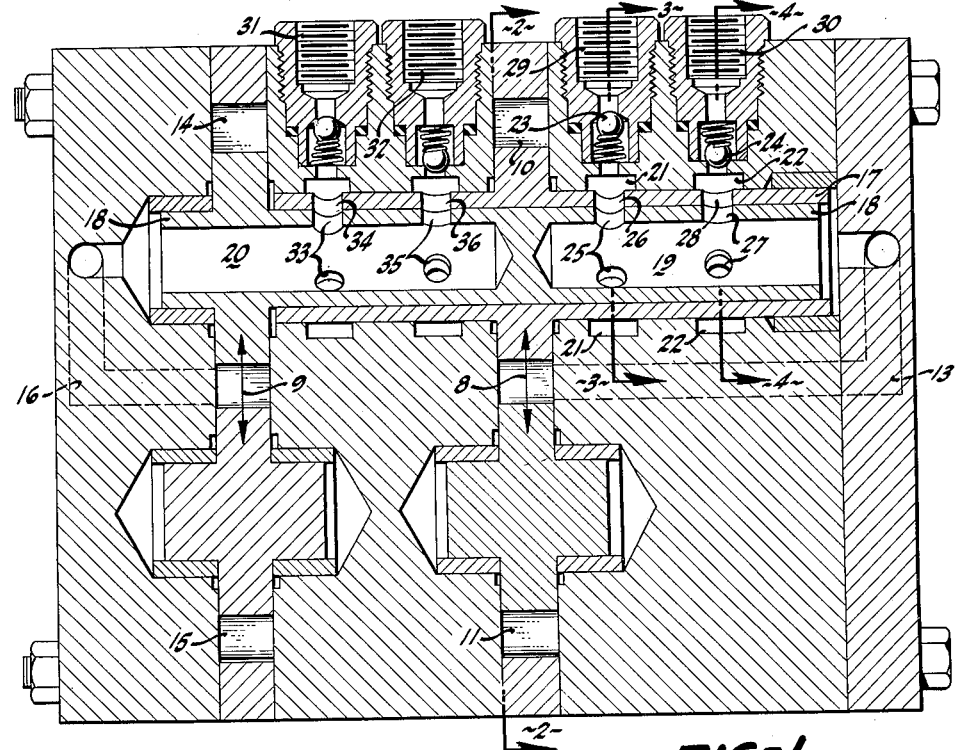
FIG. 1 is a longitudinal section of a flow proportioning device embodying this invention.
Figure 2:
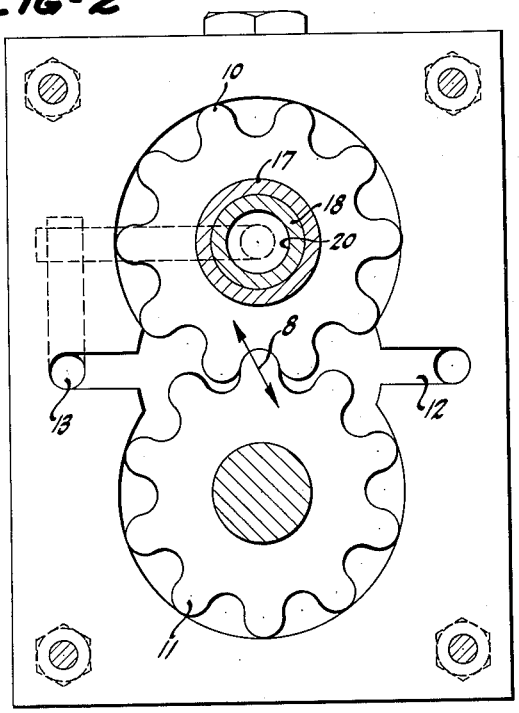
FIG. 2 is a transverse section taken on line 2—2 of FIG. 1.

Referring now to the drawings, wherein like reference characters designate like or corresponding parts throughout the several views, there is shown in FIG. 1 and FIG. 2 a first, gear type, fluid motor 8 having two intermeshing gears 10 and 11 with inlet and outlet flow passages 12 and 13 on respective sides of the meshing gear teeth of the motor. Located axially in line with the first motor 8 is a second motor 9, similar to motor 8, having intermeshing gears 14 and 15 and flow passage 12 in common with motor 8 on the same side and a flow passage 16 on the other side of motor 9, the axes of gears 10 and 14 being in line. A tubular sleeve 17 is rigidly attached to gear 10 with the longitudinal axis of the sleeve coinciding with the rotational axis of gear 10 so that sleeve 17 longitudinally rotates with gear 10 and motor 8. A second tubular sleeve 18 is rigidly attached to gear 14 with the longitudinal axis of the sleeve coinciding in with that of gear 14 so that sleeve 18 rotates with gear 14, the sleeve 18 nesting closely and concentrically within the sleeve 17 and being free to rotate relative to sleeve 17. The interior of sleeve 18 is divided into two chambers 19 and 20 by a transverse partition, the chamber 19 connecting to passage 13 from motor 8 and the chamber 20 connecting to the passage 16 from motor 9.

An annular passage 21 around the circumference of the outer sleeve 17 communicates with chamber 19 via a set of apertures 26 located circumferentially in the wall of the outer sleeve 17 and which overlie similar apertures 25 located circumferentially in the wall of the inner sleeve 18 in substantially matching positions to apertures 25, and annular passage 22 communicates in a similar manner with chamber 19 via a set of matching communicating apertures 28 and 27 in the outer and inner sleeves respectively. Annular passages 21 and 22 connect to passages 29 and 30, respectively, through ball check valves 23 and 24 which restrict the flow in passage 29 to the direction from passage 29 into chamber 19, and the flow in passage 30 to the opposite direction, from within chamber 19 to passage 30.

In a similar fashion, chamber 20 communicates with passages 31 and 32 via annular passages located circumferentially around the outer sleeve 17 and sets of apertures 34 and 36 in the outer sleeve located in an overlying communicating relation to apertures 33 and 35, respectively, in the inner sleeve. The flow in passage 31 is restricted to the same direction as that in passage 29, i.e., from passage 31 to chamber 20, by a ball check valve and the flow in passage 32 is restricted to the opposite direction, the same as passage 30, also by a check valve. Thus there are two alternate flow passages for each of chambers 19 and 20, depending upon the direction of flow. Passages 29 and 31, with the communicating sets of apertures 25—26 and apertures 33—34, respectively, establish two flow paths when the flow direction is from the chambers 19 and 20 toward motors 8 and 9, and passages 30 and 32 with the communicating sets of apertures 27—28 and apertures 35—36, respectively, establish two flow paths when the flow direction is from the motors 8 and 9 toward chambers 19 and 20.

Figures 3, 4:
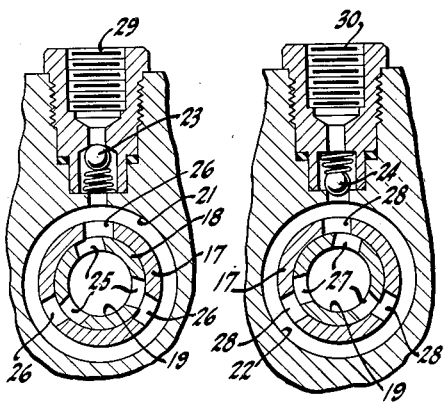
FIG. 3 is a fragmentary section taken on line 3—3 of FIG. 1.
FIG. 4 is a fragmentary section taken on line 4—4 of FIG. 1.

Due to the reversal of direction of rotation of the sleeves with a reversal of flow through the motors, the angular-directional relationship between the inner and outer sleeve communicating apertures utilized in the flow paths for one flow direction is opposite to the angular-directional relationship between the inner and outer sleeve communicating apertures for the other flow direction, as illustrated in FIGS. 3 and 4 in which the outer sleeve apertures 26 overlie inner sleeve apertures 25 with a small clockwise angular displacement in connecting passage 29 to chamber 19, whereas outer sleeve apertures 28 overlie inner sleeve apertures 27 with a small counterclockwise angular displacement in connecting passage 30 to chamber 19. Apertures 33—34 and 35—36 connecting passages 31 and 32, respectively, to chamber 20 likewise have a similar overlying relationship as apertures 25—26 and 27—28 respectively, but with the angular displacement being in the opposite direction, i.e., aperture 34 overlies aperture 33 with a small counterclockwise angular displacement and aperture 36 overlies aperture 35 with a small clockwise angular displacement.

Referring now to FIG. 3 as representative of the function of communicating apertures in the sleeves in regulating the fluid flow through any of the passages 29, 30, 31 or 32, it can be seen that communicating apertures 25 and 26 will create a variable area orifice at the juncture of the concentric sleeves which will variable throttle any flow between annular passage 21 and chamber 19. This orifice, formed at the juncture of aperture 25 and 26, varies in cross sectional area as the relative rotational speed of the nesting sleeves changes and the overlapping angular positions of the communicating apertures relative to each other changes. If the rotational speed of inner sleeve 18 increases relative to the outer sleeve 17, aperture 25 of the inner sleeve will move relative to aperture 26 of the outer sleeve and the orifice area at the juncture of these two communicating apertures will either increase or decrease depending on the direction of rotation of the sleeves. Therefore, in a condition of fluid flow between annular passage 21 and chamber 19, a pressure drop will occur in the direction of flow which is an inverse function of the cross-sectional area of the orifice formed by apertures 25 and 26 as well as a direct function of the flow rate. Thus, at any given pressure head, the volume of fluid flowing is variably controlled by varying the orifice size, which variation is proportional to any change in the relative speed of the two sleeves. More specifically, assuming that the direction of fluid flow is from the valves toward motors 8 and 9, sleeves 17 and 18 are both rotated in the clockwise direction by the two motors at speeds proportional to the flow rates in the two fluid paths. If the clockwise speed of sleeve 18 exceeds that of sleeve 17, the areas of the orifices between apertures 25 and 26 progressively increase, and thus progressively increase the flow rate to motor 8 until the speeds of the two sleeves become equal.

If the flow direction is reversed, the motors rotate both sleeves counterclockwise, and the check valves transfer flow from passage 29 to passage 30. Referring to FIG. 4, it will be seen that apertures 27—28 are arranged to increase the flow rate to motor 8 whenever it runs slower than motor 9, and vice versa. Apertures 33—34 and 35—36 similarly control the flow to motor 9 so that the two motors always rotate in substantial synchronism.

The operation of the device is further illustrated in the schematic flow diagrams of FIGS. 5 and 6. FIG. 5 shows the flow path for one direction of flow and FIG. 6 for the opposite direction. The arrows on the motors 8 and 9 and inside the sleeve, cross sections, FIGS. 5a, 5b, 6a and 6b at the top of the diagrams, indicate the direction of rotation of these items for the flow pattern illustrated. The heavy broken line and arrows indicate the flow path of the fluid in paths I and II, path I being that which operates piston 41 and path II being that which operates piston 42.

Referring to FIG. 5, it can be seen that when the flows in paths I and II are equal, the speed of rotation of both motors 8 and 9 and their connecting sleeves 17 and 18 will be the same. When the flows are unequal in the two paths, the motors and sleeves will rotate at different speeds and the size of the orifices formed at the juncture of apertures 25—26 and 33—34 will change. Assuming that piston 42 requires a higher force to move it than piston 41, without a flow proportioning device the fluid will flow in path I and carry piston 41 through a complete stroke before piston 42 would be moved. However, with the device shown, the faster flow rate in path I will rotate motor 8 and its connecting sleeve 17 faster than motor 9 and its connecting sleeve 18. The clockwise movement of sleeve 17 relative to sleeve 18 will reduce the size of the orifice formed between apertures 25—26 in flow path I, the decreasing size orifice in path I thereby reducing the flow. At the same time, the clockwise movement of sleeve 17 relative to sleeve 18 is opening up the orifice in path II formed at the juncture of apertures 33—34, thereby increasing the flow in path II. The two orifices will continue to change in size, that in path I decreasing and that in path II increasing until the pressure difference across apertures 33—34 and that across apertures 25—26 balances the flow in the two paths. In practice this automatic adjustment proceeds to completion very quickly, requiring an insignificant flow difference for its accomplishment. Thereafter, the two motors and connected sleeves rotate in unison, delivering accurately proportioned flows to the two actuators. It should be noted that the only pressure difference between passages 13 and 12, across motor 8, and between 16 and 12, across motor 9, is due to motor and sleeve friction.

Refer to FIG. 6 for the opposite flow condition, where the sleeves are rotating in the opposite or counterclockwise direction and the flow is through passage 30 and 32 rather than passages 29 and 31 as in FIG. 5. Assuming that piston 42 requires a greater force to move it than piston 41, flow in path I would again be greater than in path II if it were not controlled by the proportioning device. Motor 8 will initially rotate sleeve 17 faster than motor 9 rotates sleeve 18, the counterclockwise movement of aperture 28 relative to aperture 27 will reduce the size of the orifice formed between them and the flow in path I will be reduced by the throttling effect of the orifice. Simultaneously, aperture 36 is moving counterclockwise to aperture 35 and opening up the orifice formed by these apertures in flow path II. Thus the flows in the two paths are equalized by the action of the variable orifices formed by the communicating apertures 27—28 and 35—36 in the rotating sleeves.

Although this description has covered the situation where it is desired to divide or combine two flows in equal proportions, it should be clear that the flows can be proportional between the paths in any relation desired—all that is required is to design motors 8 and 9 for the desired relative flow rates when operating at equal speeds. For example, the gears of motor 8 may be wider or narrower than those of motor 9 to provide different flow rates. Alternatively, the motors could be gear-connected instead of directly connected to the sleeves, whereby the motors might run at different speeds while the sleeves rotate in unison. Likewise, although but two flow paths are illustrated, the described invention can be utilized to proportion the flow simultaneously among any number of paths by adding similar devices to control the flow in each path relative to that in another path. Furthermore, although this described embodiment covers the typical hydraulic system where there are intermittent reversing flows, this invention can be used in any application where it is desired to maintain a fixed proportionate flow between two or more lines regardless of the application or whether the flows are continuous or intermittent.

Obviously many modifications and variations of the present invention are possible in the light of the above teachings. It is therefore to be understood that, within the scope of the appended claims, the invention may be practiced otherwise than is specifically described in this one embodiment.

What is claimed is:

1. A flow proportioning device comprising two independently rotative, coaxial sleeves nested one within the other, a transverse partition within the inner one of said sleeves, said sleeves having lateral apertures defining at least four orifices that vary in area upon rotation of the outer one of said sleeves relative to the inner sleeve, two of said four orifices being on one side and two being on the other side of said partition, said apertures being so located relative to one another that one of said two orifices on each side of the partition increases in area while the other decreases in area, check valves arranged to permit the flow of fluid only inward through said one orifice and only outward through said other orifice on one side of the partition and only outward through said one orifice and only inward through said other orifice on the other side of the partition, two rotary fluid motors, one of said motors being connected to rotate said outer sleeve and the other motor being connected to rotate said inner sleeve, and means defining fluid passages connecting one of said motors to the orifices on one side of said partition and connecting the other motor to the orifices on the other side of said partition.

2. A flow proportioning device comprising two independently rotative, coaxial sleeves nested one within the other, a transverse partition within the inner one of said sleeves, said inner sleeve having first, second, third and fourth lateral apertures located at different positions along its length, said first and second apertures being on one side and said third and fourth apertures being on the other side of said partition, the outer one of said sleeves having first, second, third and fourth lateral apertures partially overlying the first, second, third and fourth lateral apertures of the inner sleeve, respectively, said first and fourth apertures of the outer sleeve being located toward one side of said first and fourth apertures of the inner sleeve while said second and third apertures of the outer sleeve are located toward the opposite side of said second and third apertures of the inner sleeve, means defining first, second, third and fourth annular fluid passages around said outer sleeve in alignment with said first, second, third and fourth apertures of the outer sleeve, respectively, check valves arranged to permit fluid to flow only inward to said first and third annular channels and only outward from said second and fourth annular channels, two rotary fluid motors, one of said motors being connected to rotate said outer sleeve and the other motor being connected to rotate said inner sleeve, and means defining fluid passages connecting one of said motors to the interior of said inner sleeve on one side of said partition and connecting the other motor to the interior of said inner sleeve on the other side of said partition.

3. A device as in claim 2, each of the two fluid motors being a gear motor comprising two gears in mesh, the inner sleeve being attached to and extending coaxially through the center of one such gear of one motor, and the outer sleeve being attached to and extending coaxially through the center of one such gear of the other motor.

References Cited in the file of this patent

UNITED STATES PATENTS

| | | |
|---|---|---|
| 1,333,986 | Lundgaard | Mar. 16, 1920 |
| 1,480,837 | Reineke | Jan. 15, 1924 |
| 2,195,005 | Grosvenor et al. | Mar. 26, 1940 |
| 2,628,629 | Deardorff | Feb. 17, 1953 |